(12) United States Patent
Kusafuka et al.

(10) Patent No.: US 11,899,206 B2
(45) Date of Patent: Feb. 13, 2024

(54) DISPLAY DEVICE, THREE-DIMENSIONAL DISPLAY DEVICE, HEAD-UP DISPLAY AND VEHICLE

(71) Applicant: KYOCERA Corporation, Kyoto (JP)

(72) Inventors: Kaoru Kusafuka, Tokyo (JP); Sunao Hashimoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 373 days.

(21) Appl. No.: 17/291,266

(22) PCT Filed: Oct. 28, 2019

(86) PCT No.: PCT/JP2019/042202
§ 371 (c)(1),
(2) Date: May 4, 2021

(87) PCT Pub. No.: WO2020/095746
PCT Pub. Date: May 14, 2020

(65) Prior Publication Data
US 2022/0003997 A1    Jan. 6, 2022

(30) Foreign Application Priority Data

Nov. 5, 2018  (JP) ................................. 2018-208228

(51) Int. Cl.
*B60K 35/00*   (2006.01)
*G02B 27/01*   (2006.01)

(52) U.S. Cl.
CPC .......... *G02B 27/0101* (2013.01); *B60K 35/00* (2013.01); *B60K 2370/1529* (2019.05);
(Continued)

(58) Field of Classification Search
CPC ................................................ B60K 2370/156
See application file for complete search history.

(56) References Cited

U.S. PATENT DOCUMENTS 7,522,034 B1 *  4/2009  Price ....................... F16H 63/42
                                                  340/576
2007/0295544 A1 * 12/2007  Borroni-Bird ......... B60K 37/02
                                                  903/930
(Continued)

FOREIGN PATENT DOCUMENTS

DE          3613201 A1 * 10/1987
DE       102 49 765 A1    5/2004
(Continued)

*Primary Examiner* — Kevin Kim
(74) *Attorney, Agent, or Firm* — Studebaker & Brackett PC

(57) ABSTRACT

A display device of the disclosure is a display device to be mounted on a vehicle, and includes a display panel, a first input unit, a second input unit, a third input unit, and a controller. The first input unit is configured so as to acquire an engine rotation speed. The second input unit is configured so as to acquire a vehicle speed. The third input unit is configured so as to acquire a shift position of a transmission of a vehicle. The controller is configured so that a first image representing the engine rotation speed and one or more second images representing the vehicle speed are combined and a combined image is displayed on the display panel. The controller is configured so that switching of the second images is carried out based on the shift position.

8 Claims, 14 Drawing Sheets

(52) U.S. Cl.
    CPC    *B60K 2370/1531* (2019.05); *B60K 2370/167* (2019.05); *B60K 2370/52* (2019.05); *G02B 2027/014* (2013.01); *G02B 2027/0112* (2013.01); *G02B 2027/0141* (2013.01)

(56)  References Cited

U.S. PATENT DOCUMENTS

| | | | | |
|---|---|---|---|---|
| 2011/0260850 | A1* | 10/2011 | Ringenwald | B60K 35/00 340/461 |
| 2018/0079306 | A1* | 3/2018 | Kim | B60K 35/00 |
| 2019/0135108 | A1* | 5/2019 | Manso Aguado | G07C 5/08 |

FOREIGN PATENT DOCUMENTS

| | | | |
|---|---|---|---|
| DE | 10 2009 058 870 A1 | | 6/2011 |
| JP | 2007-230297 A | | 9/2007 |
| JP | 2010190577 A | * | 9/2010 |
| JP | 2017202721 A | | 11/2017 |
| JP | 2018-120189 A | | 8/2018 |
| WO | WO-2005052948 A2 | * | 6/2005 ............ G01D 13/26 |
| WO | 2018/056536 A1 | | 3/2018 |

* cited by examiner

DISPLAY DEVICE, THREE-DIMENSIONAL DISPLAY DEVICE, HEAD-UP DISPLAY AND VEHICLE

CROSS-REFERENCE TO RELATED APPLICATION

This application claims priority to Japanese Patent Application No. 2018-208228, which was filed on Nov. 5, 2018, the contents of which are incorporated herein by reference in its entirety.

TECHNICAL FIELD

The present disclosure relates to a display device, a three-dimensional display device, a head-up display, and a vehicle.

BACKGROUND ART

In a related art, in a vehicle, a head-up display is known in which a speedometer or the like is superimposed and displayed on a landscape in front of a driver. For example, Patent Literature 1 discloses a display system that projects a traveling speed or a speed limit on a windshield which is a projected member, when the vehicle is traveling as a leading vehicle. This display system does not project the traveling speed and the speed limit on the windshield when the vehicle is traveling following a preceding vehicle.

CITATION LIST

Patent Literature

Patent Literature 1: Japanese Unexamined Patent Publication No. 2017-202721

SUMMARY

A display device of the disclosure is a display device to be mounted on a vehicle, and includes a display panel, a first input unit, a second input unit, a third input unit, and a controller. The first input unit is configured so as to acquire an engine rotation speed. The second input unit is configured so as to acquire a vehicle speed. The third input unit is configured so as to acquire a shift position of a transmission of a vehicle. The controller is configured so that a first image representing the engine rotation speed and one ore more second images representing the vehicle speed are combined and a combined image is displayed on the display panel. The controller is configured so that switching of the second images is carried out based on the shift position.

A three-dimensional display device of the disclosure is a three-dimensional display device to be mounted on a vehicle, and includes a display panel, an optical element, a first input unit, a second input unit, a third input unit, and a controller. The display panel includes an active area which includes a plurality of subpixels arranged in a grid along a first direction and a second direction orthogonal to the first direction. The optical element is an optical element configured so as to define a direction of image light emitted from the subpixels, and propagate image light emitted from the subpixels in a first region, toward a position of a left eye of a user and propagate image light emitted from the subpixels in a second region different from the first region, toward a position of a right eye of the user. The first input unit is configured so as to acquire an engine rotation speed. The second input unit is configured so as to acquire a vehicle speed. The third input unit is configured so as to acquire a shift position of a transmission of a vehicle. The controller is configured so that a first image representing the engine rotation speed and one or more second images representing the vehicle speed are combined into an image having parallax with respect to the right eye and left eye of the user and a combined image is displayed on the display panel. The controller is configured so that switching of the second images is carried out based on the shift position. The controller is configured so that, when switching of the second images is carried out, the second images are displayed by giving parallax thereto so that the second images are recognized as moving relative to the first image by a distance of from the user to the second images that is different a distance of from the user to the first image.

A head-up display of the disclosure is a head-up display to be mounted on a vehicle, and includes a display panel, an optical element, an optical system, a first input unit, a second input unit, a third input unit, and a controller. The display panel includes an active area which includes a plurality of subpixels arranged in a grid along a first direction and a second direction orthogonal to the first direction. The optical element is an optical element configured so as to define a direction of image light emitted from the subpixels, and propagate image light emitted from the subpixels in a first region, toward a position of a left eye of a user and propagate image light emitted from the subpixels in a second region different from the first region, toward a position of a right eye of the user. The optical system is configured so as to project the image light which is emitted from the active area and whose direction is defined by the optical element so as to form a virtual image in a field of view of the user. The first input unit is configured so as to acquire an engine rotation speed. The second input unit is configured so as to acquire a vehicle speed. The third input unit is configured so as to acquire a shift position of a transmission of a vehicle. The controller is configured so that a first image representing the engine rotation speed and one or more second images representing the vehicle speed are combined into an image having parallax with respect to the right eye and left eye of the user and a combined image is displayed on the display panel. The controller is configured so that switching of the second images is carried out based on the shift position. The controller is configured so that, when switching of the second images is carried out, the second images are displayed by giving parallax thereto so that the second images are recognized as moving relative to the first image by a distance of from the user to the second images that is different from a distance of from the user to the first image.

A vehicle of the disclosure includes a head-up display. The head-up display includes a display panel, an optical element, an optical system, a first input unit, a second input unit, a third input unit, and a controller. The display panel includes an active area which includes a plurality of subpixels arranged in a grid along a first direction and a second direction orthogonal to the first direction. The optical element is an optical element configured so as to define a direction of image light emitted from the subpixels, and propagate image light emitted from the subpixels in a first region, toward a position of a left eye of a user and propagate image light emitted from the subpixels in a second region different from the first region, toward a position of a right eye of the user. The optical system is configured so as to project the image light which is emitted from the active area and whose direction is defined by the optical element so as to form a virtual image in a field of view of the user. The first input unit is configured so as to acquire an engine rotation speed. The second input unit is configured so as to acquire a vehicle speed. The third input unit is configured so as to acquire a shift position of a transmission of a vehicle. The controller is configured so that a first image representing the engine rotation speed and one or more second images representing the vehicle speed are combined into an image having parallax with respect to the right eye and left eye of the user and a combined image is displayed on the display panel. The controller is configured so that switching of the second images is carried out based on the shift position. The controller is configured so that, when switching of the second images is carried out, the second images are displayed by giving parallax thereto so that the second images are recognized as moving relative to the first image by a distance of from the user t the second images that is different from a distance of from the user to the first image.

DETAILED DESCRIPTION

A display system of a related art is simply an image of a measurement instrument and does not fully consider the design of the image.

The disclosure provides a display device, a three-dimensional display device, a head-up display, and a vehicle which are capable of displaying a vehicle speed and an engine rotation speed with enhanced design.

Hereinafter, embodiments of the disclosure will be described with reference to drawings. The diagrams used in the following description are schematic. The dimensional ratios on the drawings do not always match actual ones. The numerical values of a shift position, an engine rotation speed, and a vehicle speed used in the following description are examples and do not necessarily match a relationship between the shift position, the engine rotation speed, and the vehicle speed of an actual vehicle.

Figure 1:
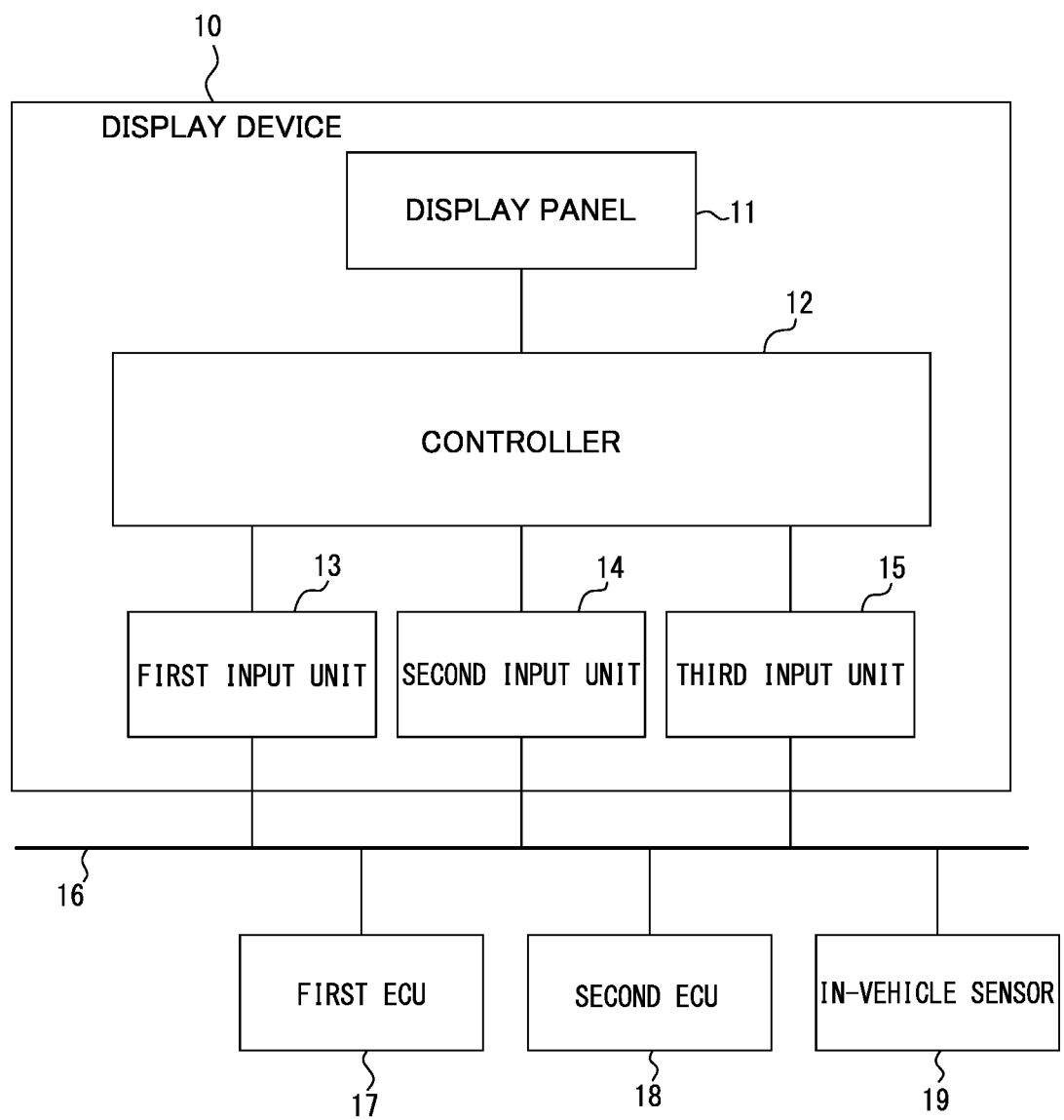
FIG. 1 is a block diagram illustrating a schematic configuration of a display device according to a first embodiment.

A display device 10 according to a plurality of embodiments can be mounted on a vehicle. The display device 10 can be mounted in a position easily visible to a user, such as in an instrument panel or on a dashboard. The display device 10 is configured to display the rotation speedometer of an engine and the vehicle speedometer of a vehicle. As illustrated in FIG. 1, the display device 10 includes a display panel 11, a controller 12, a first input unit 13, a second input unit 14, and a third input unit 15. In the disclosure, the user is a concept including a driver and a passenger.

"Vehicles" in the disclosure include automobiles and industrial vehicles. Automobiles include, but are not limited to, passenger cars, trucks, buses, motorcycles, trolley buses, and the like and may include other vehicles traveling on the road. The industrial vehicles include industrial vehicles for agriculture and construction. The industrial vehicles include, but are not limited to, forklifts and golf carts. The industrial vehicles for agriculture include, but are not limited to, tractors, tillers, transplanters, binders, combines, and lawnmowers. The industrial vehicles for construction include, but are not limited to, bulldozers, scrapers, excavators, crane trucks, dump trucks, and road rollers. The vehicles include those that run manually. The classification of vehicles is not limited to those described above. For example, an automobile may include an industrial vehicle capable of traveling on a road and the same vehicle may be included in a plurality of classifications.

Vehicles in the disclosure include vehicles with manual transmissions (MT vehicles) and vehicles with automatic transmissions (AT vehicles).

The display panel 11 is a display element configured so as to display an image according to a signal from the controller 12. As the display panel 11, various display elements such as a liquid crystal display (LCD), an organic EL (Electro-Luminoscence) display, an inorganic EL display, a plasma display panel (PDP), a field emission display (FED), and the like can be adopted. In the present application, the area where the actual image of the display panel 11 is displayed may be referred to as an active area. The display panel 11 displays various images in the active area.

The controller 12 is connected to each component of the display device 10 and is configured so as to control each component. The controller 12 is configured as, for example, a processor. The controller 12 may include one or more processors. The processor may include a general-purpose processor that loads a specific program and executes a specific function, and a dedicated processor specialized for a specific type of processing. The dedicated processor may include an application specific integrated circuit (ASIC). The processor may include a programmable logic device (PLD). The PLD may include an FPGA (Field-Programmable Gate Array). The controller 12 may be either a SoC (System-on-a-Chip) or a SiP (System In a Package) in which one or more processors cooperate. The controller 12 includes a storage unit, and the storage unit may store various kinds of information, a program for operating each component of the display device 10, and the like. The storage unit may include, for example, a semiconductor memory or the like. The storage unit may function as a work memory of the controller 12. The processing executed by the controller 12 will be described later.

The first input unit 13 is configured so as to acquire the engine rotation speed. The first input unit 13 includes an input terminal that receives an input of a signal indicating the rotation speed of the engine. The first input unit 13 may be connected to an in-vehicle network 16. The in-vehicle network 16 includes, for example, a CAN (Control Area Network). The first input unit 13 can acquire the engine rotation speed from a first ECU (Electronic Control Unit) 17 that controls the engine in the vehicle via the in-vehicle network 16. The first ECU 17 includes an engine control ECU and the like.

The second input unit 14 is configured so as to acquire the vehicle speed of the vehicle. The second input unit 14 includes an input terminal that receives an input of a signal indicating the vehicle speed. The second input unit 14 can acquire a vehicle speed signal from the first ECU (Electronic Control Unit) 17 or another ECU via the in-vehicle network 16. Alternatively, the second input unit 14 can receive a vehicle speed pulse signal from an in-vehicle sensor 19 which is attached to the axle of a tire and measures the rotation speed of the tire via the in-vehicle network 16.

The third input unit 15 is configured so as to acquire the shift position of a transmission of the vehicle. The third input unit 15 receives a notification of the state change when the engagement of a power transmission device (clutch) between the engine and the transmission is cut off. When the shift position is changed, the third input unit 15 can acquire a new shift position. The third input unit 15 can acquire such information from a second ECU 18 (transmission ECU) that controls the transmission via the in-vehicle network 16.

The controller 12 is configured so that a first image and one or more second images are combined and a combined image is displayed on the display panel 11. The first image illustrates the engine rotation speed acquired by the first input unit 13. The second images illustrate the vehicle speed acquired by the second input unit 14. The controller 12 is configured so that switching of the second images are carried out based on the shift position acquired by the third input unit 15. The switching of the second images by the controller 12 will be described in detail below with reference to FIGS. 2 to 6.

Figure 2:
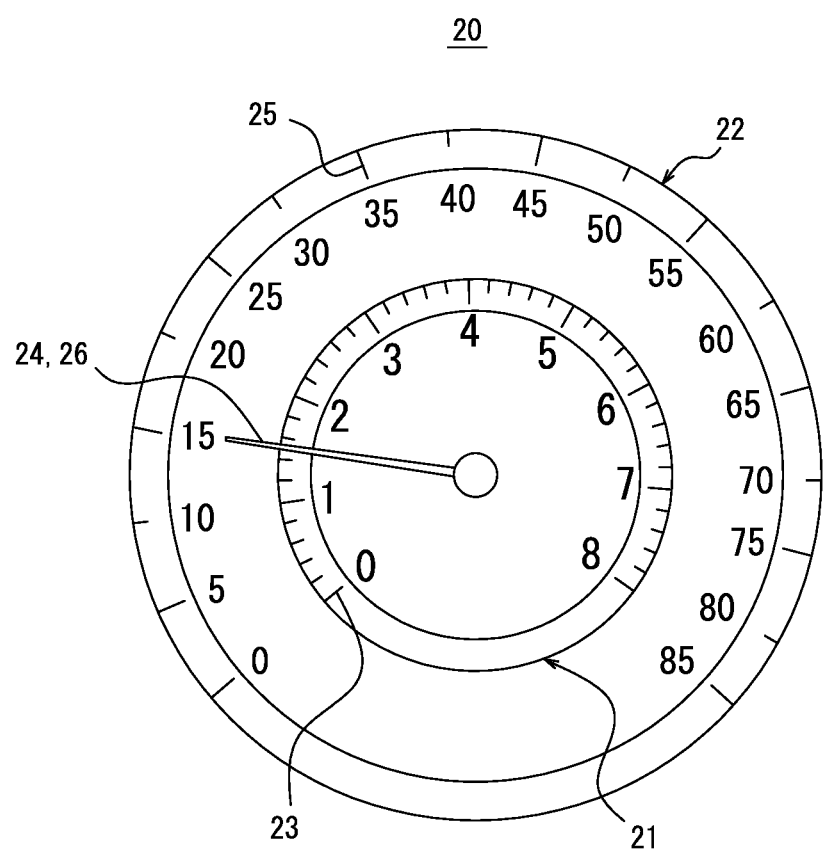
FIG. 2 is a diagram illustrating a display example of the display device of FIG. 1 when a gear ratio is high.

As illustrated in FIG. 2, a display image 20 of the display device 10 is a combined image of a rotation speedometer image 21 illustrating the rotation speed of the engine and a vehicle speedometer image 22 illustrating the vehicle speed of the vehicle. The rotation speedometer image 21 is the first image. The vehicle speedometer image 22 is the second image. As an example, the rotation speedometer image 21 has a circular shape. The vehicle speedometer image 22 has an annular shape having a hollow portion of the same size as the rotation speedometer image 21. The vehicle speedometer image 22 is ring-shaped or donut-shaped. The shapes of the rotation speedometer image 21 and the vehicle speedometer image 22 are not limited thereto and may have a semi-circular shape or a semi-annular shape.

The rotation speedometer image 21 includes a rotation speed scale 23 and a rotation speed indicator needle 24. The rotation speed indicator needle 24 is a first indicator element. On the rotation speed scale 23, a numerical value indicating the number of rotations per unit time (for example, 1 minute) is displayed. In the example of FIG. 2, the rotation speed scale 23 indicates the rotation speed of 1000 rpm to 8000 rpm with numerals 1 to 8. The rotation speed scale 23 indicates the rotation speed of the engine according to the position of the rotation speed scale 23 pointed by the rotation speed indicator needle 24. The vehicle speedometer image 22 includes a vehicle speed scale 25 and a vehicle speed indicator needle 26. The vehicle speed indicator needle 26 is a second indicator element. On the vehicle speed scale 25, a numerical value indicating the speed of the vehicle according to the speed per hour or the like is displayed. In the example of FIG. 2, the vehicle speed of 0 km to 80 km is represented by numerals from 0 to 80. The vehicle speed of the vehicle is indicated by the position of the vehicle speed scale 25 pointed by the vehicle speed indicator needle 26. The color of each part of the rotation speedometer image 21 and the vehicle speedometer image 22 can be arbitrarily set by the controller 12. The controller 12 can adopt bright colors as the color of each part of the rotation speedometer image 21 and the vehicle speedometer image 22.

The controller 12 carries out display of the rotation speed indicator needle 24 and the vehicle speed indicator needle 26 as one indicator element in a steady state where switching of the shift position of the transmission is not carried out. The shift position of the transmission corresponds to the gear switching position of the transmission or the gear ratio. Generally, the shift position of the transmission is called a first gear, a second gear, a third gear, a fourth gear, a fifth gear, and the like from the higher gear ratio to the lower gear ratio. The first gear is sometimes called a low gear. The fifth gear is sometimes called a top gear. However, the number of gears and the designation of the shift position are not limited thereto. When the power transmission device of the transmission is engaged, the ratio of the engine rotation speed to the vehicle speed is fixed. By adjusting the scale of the displayed numerical values of the rotation speed scale 23 and the vehicle speed scale 25, the rotation speed indicator needle 24 and the vehicle speed indicator needle 26 can be displayed as one indicator (indicator element) for the displayed numerical values.

Figure 3:
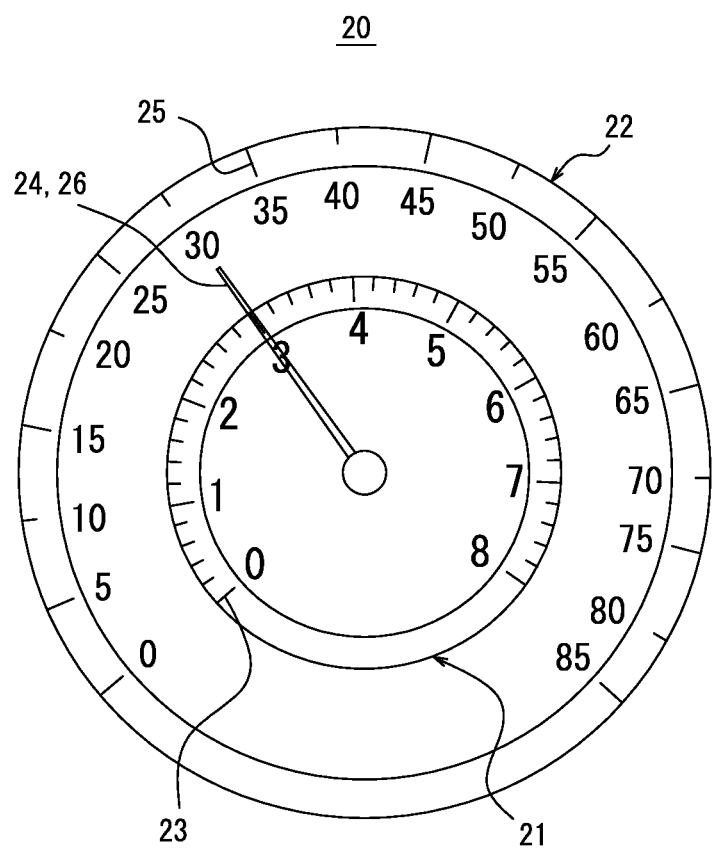
FIG. 3 is a diagram illustrating a display example of the display device of FIG. 1 before switching of a shift position is carried out.

In the example of FIG. 2, for example, the shift position of the transmission is at the second gear. In this example, when the engine rotation speed is 1500 rpm, the vehicle speed is 15 km/h. Therefore, the rotation speed indicator needle 24 and the vehicle speed indicator needle 26 are displayed as one indicator element. When the shift position does not change and the engine rotation speed changes, the vehicle speed also changes at the same rate as the change in the engine rotation speed, and therefore the rotation speed indicator needle 24 and the vehicle speed indicator needle 26 can be displayed as one indicator element. For example, when the vehicle is accelerating, as illustrated in FIG. 3, if the engine rotation speed changes to 3000 rpm, the vehicle speed doubles to 30 km/h at the same rate as the change in the engine rotation speed.

In the case of an MT vehicle, a driver handles the shift position by an operation of stepping on a clutch pedal. In the case of an AT vehicle, the computer of the vehicle automatically handles the shift position based on information such as a vehicle speed and the state of an accelerator pedal. In the MT vehicle, when the driver operates the clutch to cut off the power transmission, or when the computer carries out the same clutch operation in the AT vehicle, the third input unit 35 acquires the clutch operation information. The controller 12 receives the clutch operation information and changes the display of the vehicle speedometer image 22 to a light color or monochrome display in the display image 20. At this time, the display of the vehicle speed indicator needle 26 may disappear. At the same time, as illustrated in FIG. 4, a plurality of vehicle speedometer images 22, 22a, and 22b are displayed side by side.

Figure 4:
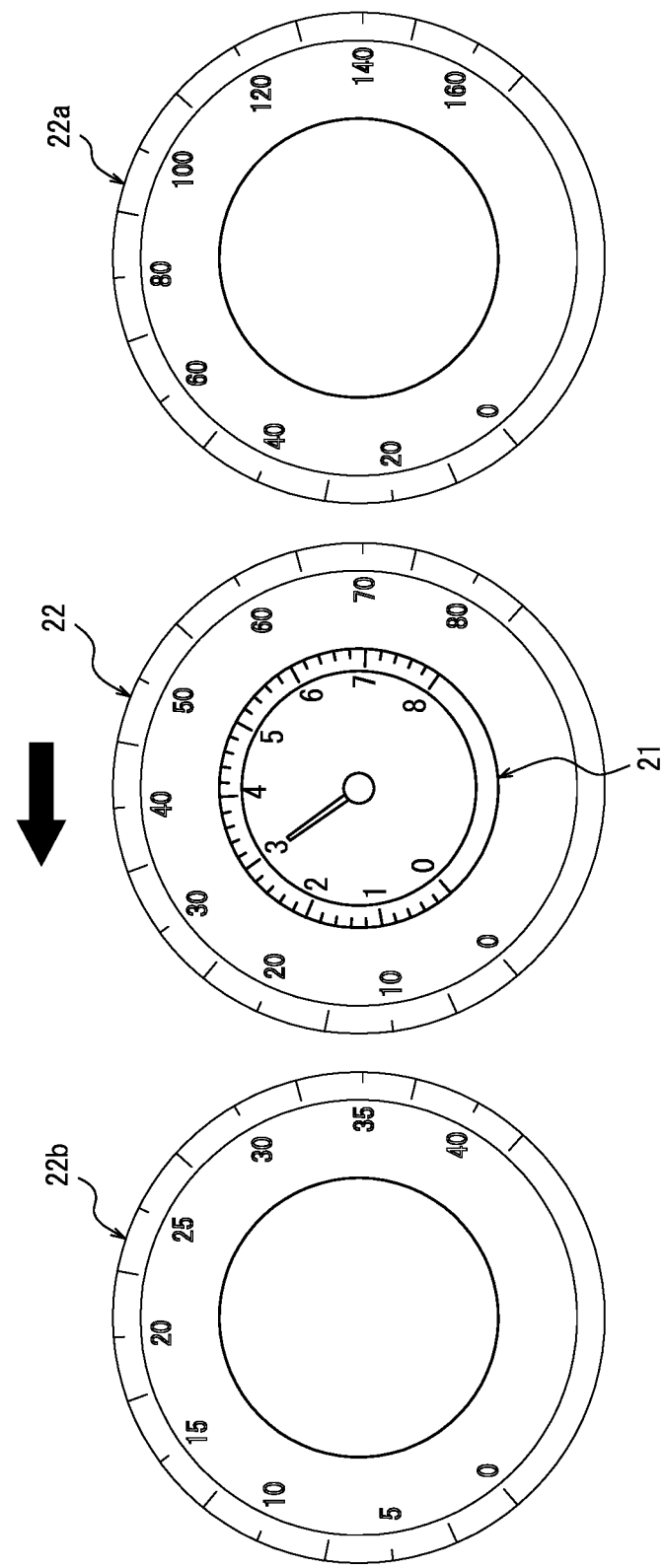
FIG. 4 is a diagram illustrating a display example of the display device of FIG. 1 when switching of the shift position is carried out.

In the example illustrated in FIG. 4, the vehicle speedometer image 22a corresponds to the case where the shift position is at the third gear. The vehicle speedometer image 22b corresponds to the case where the shift position is at the first gear. The plurality of vehicle speedometer images 22, 22a, and 22b have different scales of numbers displayed on the vehicle speed scale 25. When the shift position (for example, the second gear) is changed, the controller 12 causes the vehicle speedometer image 22 to be changed to the vehicle speedometer image 22a corresponding to the changed shift position (for example, the third gear). The information on the change of the shift position is acquired via the third input unit 15. The shift position change is executed by moving the vehicle speedometer image 22a to the vicinity of the rotation speedometer image 21. For example, the change of the shift position is graphically presented to the user by the vehicle speedometer images 22, 22a, and 22b moving together in the left direction (arrow direction) on the display image 20 until the rotation speedometer image 21 fits the hollow portion of the vehicle speedometer image 22a. That is, by moving the vehicle speedometer images 22, 22a, 22b, the change of the shift position is illustrated by the images. The display mode for switching the vehicle speedometer images 22, 22a, and 22b is not limited to the above. For example, the plurality of vehicle speedometer images 22, 22a, and 22b may move in an arc rather than a straight line.

Figure 5:
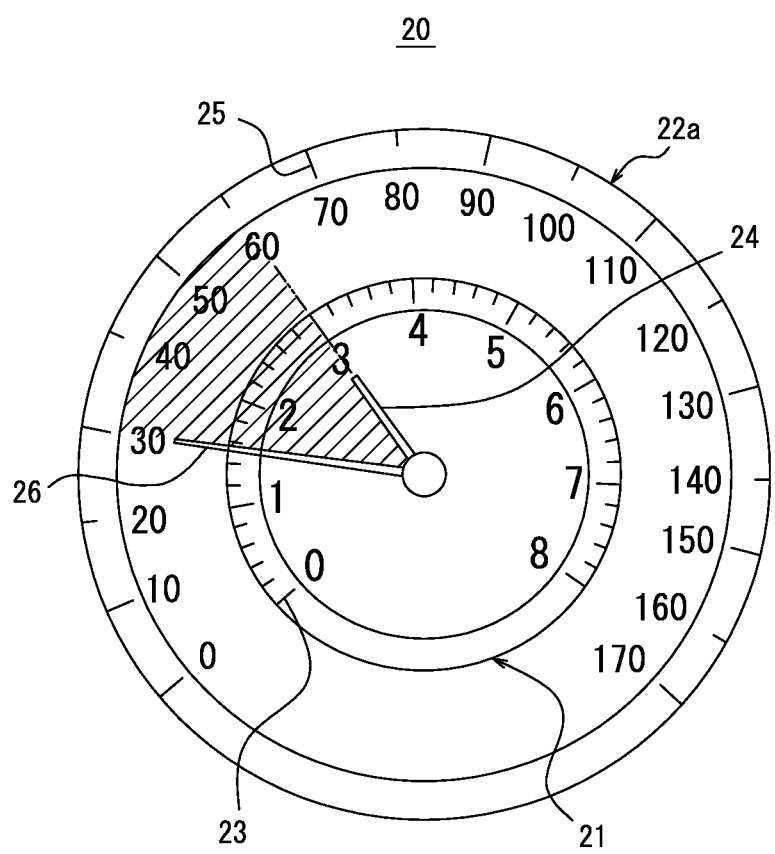
FIG. 5 is a diagram illustrating a display example of the display device of FIG. 1 after switching of the shift position is carried out.

FIG. 5 illustrates the state immediately after switching of the shift position is carried out from the second gear to the third gear. In this state, the clutch between the engine and the transmission is not completely engaged. Therefore, the directions pointed by the rotation speed indicator needle 24 and the vehicle speed indicator needle 26 do not match. Therefore, the rotation speed indicator needle 24 and the vehicle speed indicator needle 26 are not displayed as one indicator element. In the example of FIG. 5, the rotation speed indicator needle 24 of the rotation speedometer image 21 points to 3000 rpm on the rotation speed scale 23. The vehicle speed indicator needle 26 in the vehicle speedometer image 22a points to 30 km/h on the vehicle speed scale 25. To indicate that there is a discrepancy between the engine rotation speed and the vehicle speed, a region between the rotation speed indicator needle 24 and the vehicle speed indicator needle 26 may be highlighted. The highlight can be displayed by changing the brightness or color with other parts of the rotation speedometer image 21 and the vehicle speedometer image 22a. In FIG. 5, the highlight is shaded for illustration.

Figure 6:
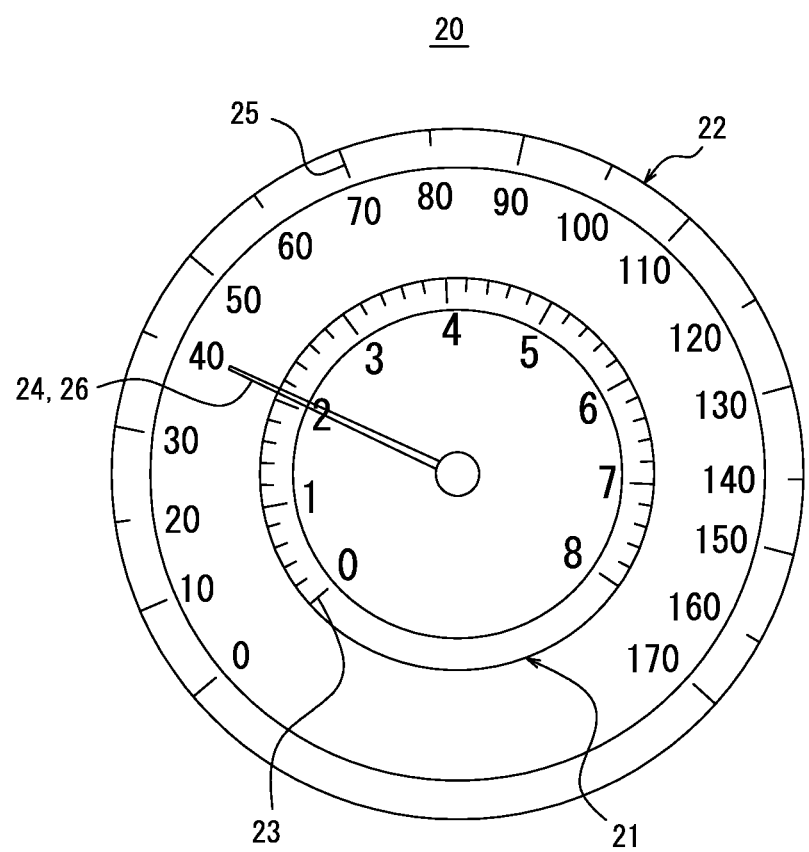
FIG. 6 is a diagram illustrating a display example of the display device of FIG. 1 when the gear ratio is low.

When the clutch between the engine and the transmission is completely engaged after a half-engaged state, the pointing directions of the rotation speed indicator needle 24 and the vehicle speed indicator needle 26 coincide with each other, as illustrated in FIG. 6. At this time, the rotation speed indicator needle 24 and the vehicle speed indicator needle 26 are displayed as one indicator element. In the example of FIG. 6, the indicator element in which the rotation speed indicator needle 24 of the rotation speedometer image 21 and the vehicle speed indicator needle 26 of the vehicle speedometer image 22a are combined into one indicates about 4000 rpm on the rotation speed scale 23 and about 40 km/h on the vehicle speed scale 25.

The above has been described by taking the switching of the shift position from the second gear to the third gear when the vehicle is accelerating as an example, but the same applies to the change of other shift positions.

As described above, in the display of the rotation speedometer image 21 and the vehicle speedometer images 22, 22a, 22b, the engine rotation speed and the vehicle speed of the vehicle can be displayed by using one indicator element in the steady state. When switching of the shift position is carried out, the change in the shift position of the transmission can be expressed by moving the plurality of vehicle speedometer images 22, 22a, and 22b on the image to display the switching. The state of clutch engagement/disengagement can be expressed by the deviation between the rotation speed indicator needle 24 and the vehicle speed indicator needle 26.

Therefore, unlike the display method of the vehicle speed and the engine rotation speed in a related art, the display device 10 can display the rotation speedometer image 21 and the vehicle speedometer image 22 in a unified design with enhanced design. Since the rotation speedometer and the vehicle speedometer are combined into one image, compared with the rotation speedometer and vehicle speedometer in a related art, according to the display device 10, necessary information can be instantly viewed, and therefore the driving safety is improved. Since it is possible to express images according to the state of the transmission and clutch, the display device 10 can provide fun and enjoyment to users who are interested in the mechanical mechanism of the vehicle. In the case of an MT vehicle, the driver can enjoy a realistic sense of driving by looking at the displayed image in correspondence with the operation of stepping on the clutch pedal and the operation of releasing the clutch.

A plurality of embodiments applied to a three-dimensional stereoscopic display will be described. A three-dimensional display device 30 includes an irradiator 31, a display panel 32, a parallax barrier 33 as an optical element, a controller 34, a first input unit 35a, a second input unit 35b, and a third input unit 35c.

The irradiator 31 is placed on one surface side of the display panel 32 and is configured so as to irradiate the surface of the display panel 32. The irradiator 31 is placed on the side opposite to the user when viewed from the display panel 32. The irradiator 31 may include a light source, a light guide plate, a diffusion plate, a diffusion sheet, and the like. The irradiator 31 is configured so as to emit irradiation light from a light source and to make the irradiation light uniform in the surface direction of the display panel 32 by a light guide plate, a diffusion plate, a diffusion sheet, or the like. The irradiator 31 is configured so as to emit uniformed light towards the display panel 32.

Like the display panel 11, the display panel 32 is a display element that displays an image according to a signal from the controller 34. Various display elements can be adopted as the display panel 32. As the display panel 32, for example, a display panel such as a transmissive liquid crystal display panel can be adopted. As the display panel 32, a self-luminous display element or a display panel of an MEMS (Micro Electro Mechanical Systems) shutter type may be adopted. When a self-luminous display element such as an organic EL display or an inorganic EL display is used as the display panel 32, the irradiator 31 is unnecessary. The display panel 32 displays various images in an active area 36 of the display panel 32.

Figure 8:
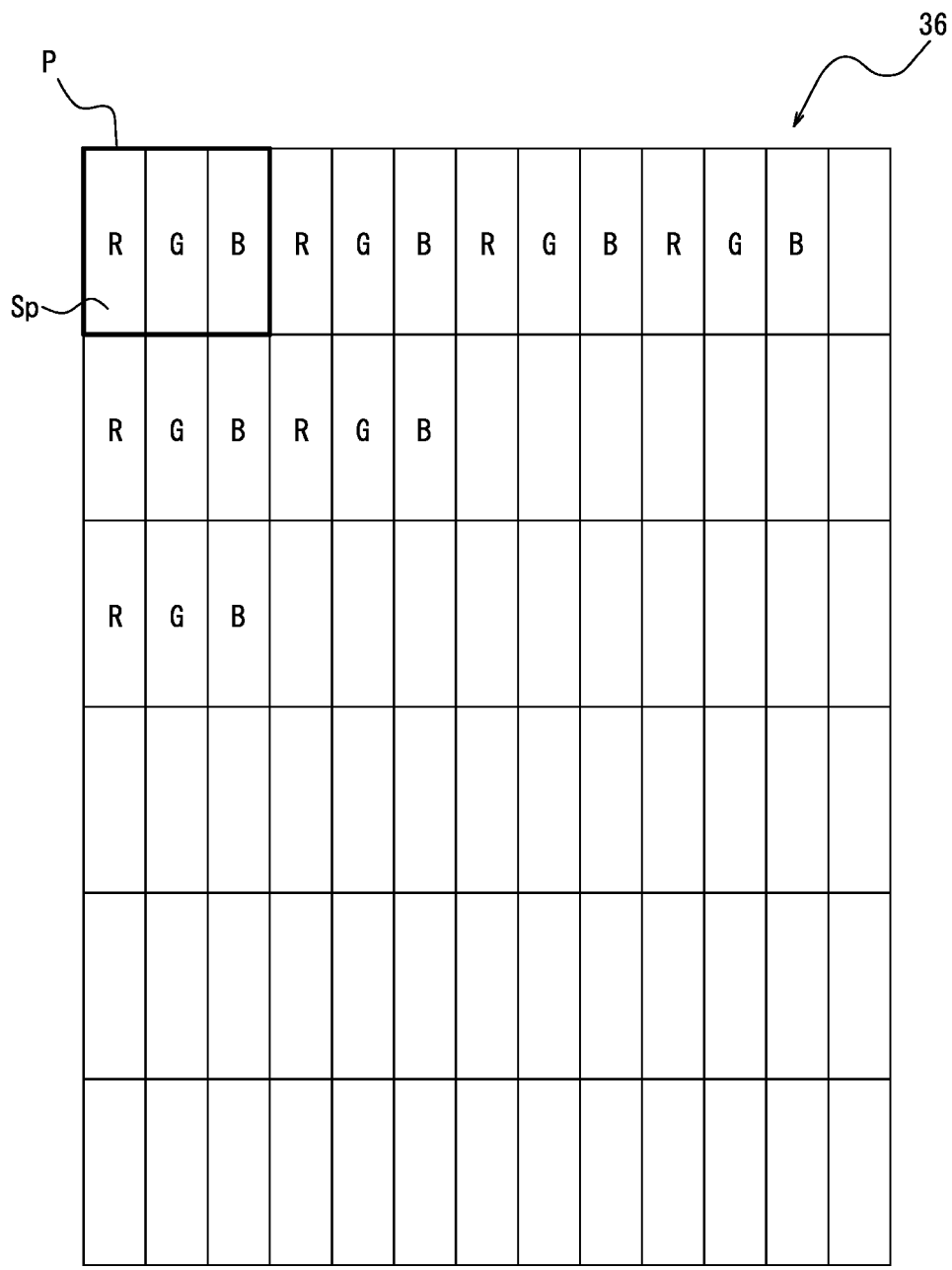
FIG. 8 is an enlarged view of an active area of a display panel of FIG. 7.

As illustrated in FIG. 8, the active area 36 of the display panel 32 includes a plurality of subpixels Sp arranged in a grid along a first direction (x direction) and a second direction (y direction) intersecting the first direction. The second direction can be a direction substantially orthogonal to the first direction. The first direction corresponds to the parallax direction that gives parallax to both eyes of the user. In the three-dimensional display device 30 of the type in which the user directly looks at the display panel 32 in a normal seated or upright posture, the first direction can be the horizontal direction or the left-right direction as seen by the user. The second direction can be a vertical direction or up and down direction as seen by the user. In the following, the first direction will be described as the x direction, and the second direction will be described as the y direction. In each diagram illustrating the active area 36 of the display panel 32, the x direction is illustrated as the direction from right to left. The y direction is illustrated as a direction from top to bottom. A direction which is orthogonal to the x and y directions and faces the eyes of the user is a z direction.

The plurality of subpixels Sp are arranged in a grid pattern in the x direction and the y direction. In the plurality of embodiments, the subpixel Sp is longer in the y direction than in the x direction. Each subpixel Sp corresponds to one of the colors R (Red), G (Green), and B (Blue). The three subpixels Sp of R, G, and B can form one pixel P as a set. In FIG. 8, one of the pixels P is illustrated by emphasizing the outer circumference for explanation. One pixel P can be called one pixel. The length of one pixel in the x and y directions can be set to 1:1 but is not limited thereto. The x direction is, for example, the direction in which the plurality of subpixels Sp constituting one pixel P are arranged.

Figure 7:
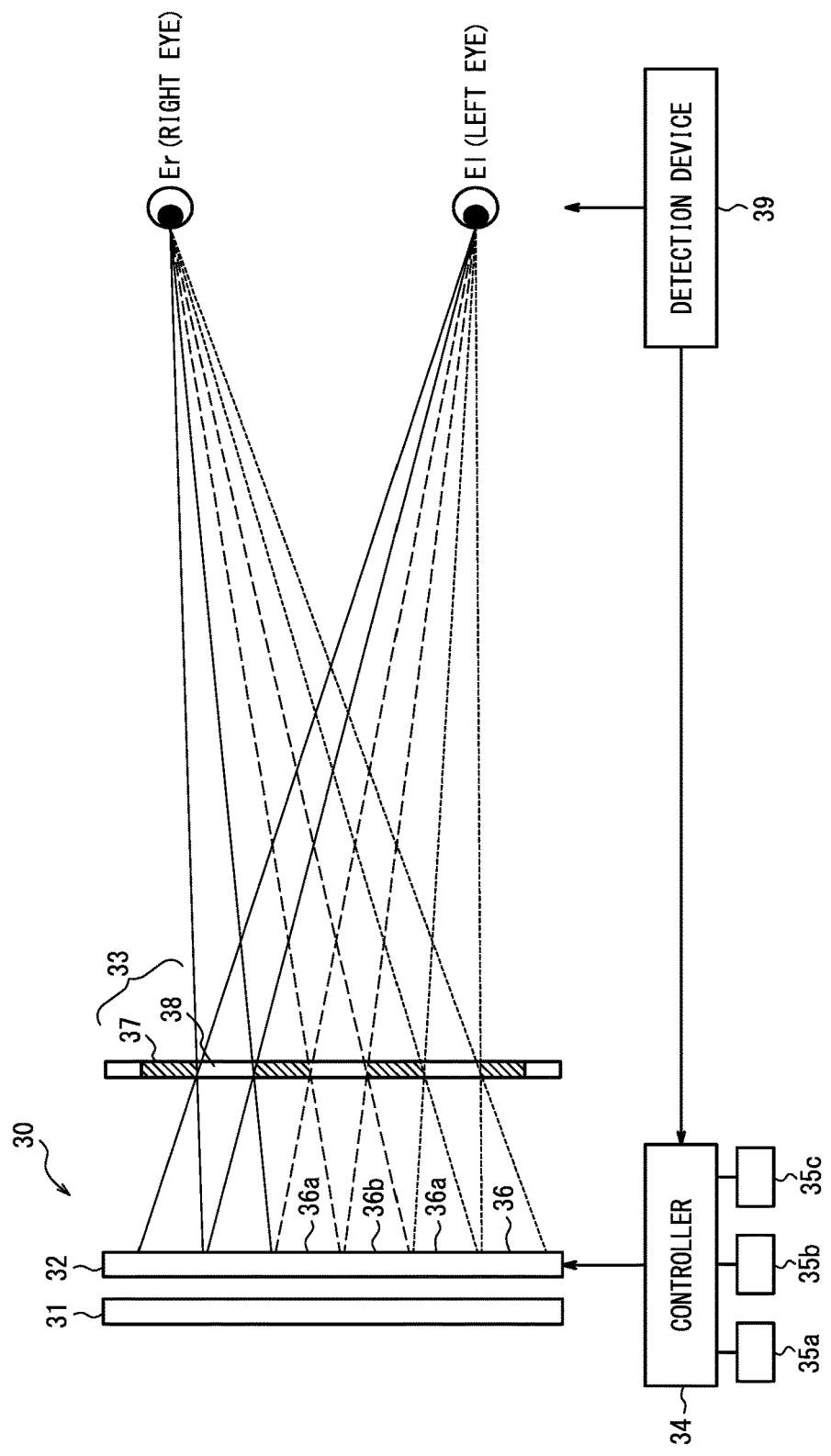
FIG. 7 is a diagram illustrating a schematic configuration of a three-dimensional display device according to a second embodiment.

The parallax barrier 33 is an optical element configured to define a direction of the image light emitted from the subpixel Sp. As illustrated in FIG. 7, the parallax barrier 33 is configured so as to define the direction of the image light, which is the propagation direction of the image light emitted from the subpixel Sp, by a dimming region 37 and a light-transmitting region 38. The visible range of the image light emitted from the subpixel Sp is determined by the parallax barrier 33. The parallax barrier 33 is located on the opposite side of the irradiator 31 with respect to the display panel 32, as illustrated in FIG. 7. The parallax barrier 33 can be located on the irradiator 31 side of the display panel 32.

Figure 9:
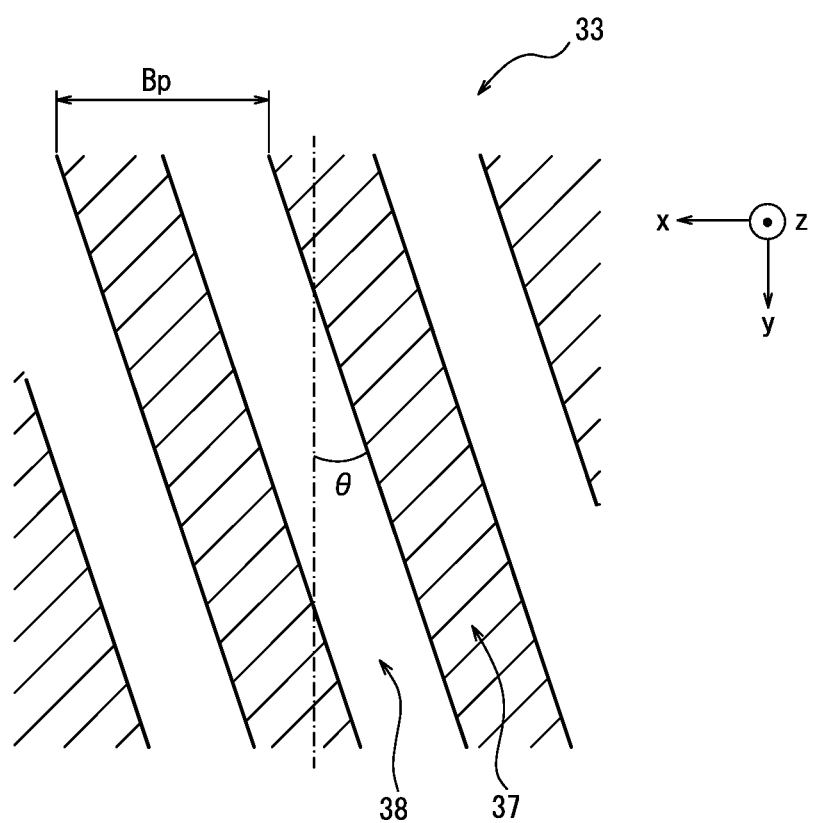
FIG. 9 is a diagram illustrating an example of a configuration of a parallax barrier of FIG. 7.

The parallax barrier 33 may include a plurality of dimming regions 37 and light-transmitting regions 38 extending in a predetermined direction in an xy plane, as illustrated in FIG. 9. The dimming regions 37 and the light-transmitting regions 38 are alternately arranged at a predetermined pitch. The dimming region 37 and the light-transmitting region 38 may be formed in the form of a transparent plate-like member such as resin or glass. The plurality of dimming regions 37 define the light-transmitting region 38 between the dimming regions 37 adjacent to each other. The light-transmitting region 38 has a higher light transmittance than the dimming region 37. The light transmittance of the light-transmitting region 38 can be 100 times or more than that of the dimming region 37. The predetermined direction in which the dimming region 37 and the light-transmitting region 38 extend can be a direction having an inclination with respect to the y direction or the y direction. Due to the inclination with respect to the y direction, moiré is less likely recognized in the image displayed by the three-dimensional display device 30.

The parallax barrier 33 may include a liquid crystal shutter. The liquid crystal shutter can control the light transmittance according to the applied voltage. The liquid crystal shutter includes a plurality of pixels, and the light transmittance in each pixel may be controlled. The liquid crystal shutter may form a region having a high light transmittance or a region having a low light transmittance in an arbitrary shape.

Similar to the controller 12, the controller 34 is connected to each component of the three-dimensional display device 30 and is configured to control each component. The controller 34 is configured so as to include, for example, one or more processors.

The first input unit 35a, the second input unit 35b, and the third input unit 35c correspond to the first input unit 13, the second input unit 14, and the third input unit 15, respectively, and thus the description thereof will be omitted.

Figure 10:
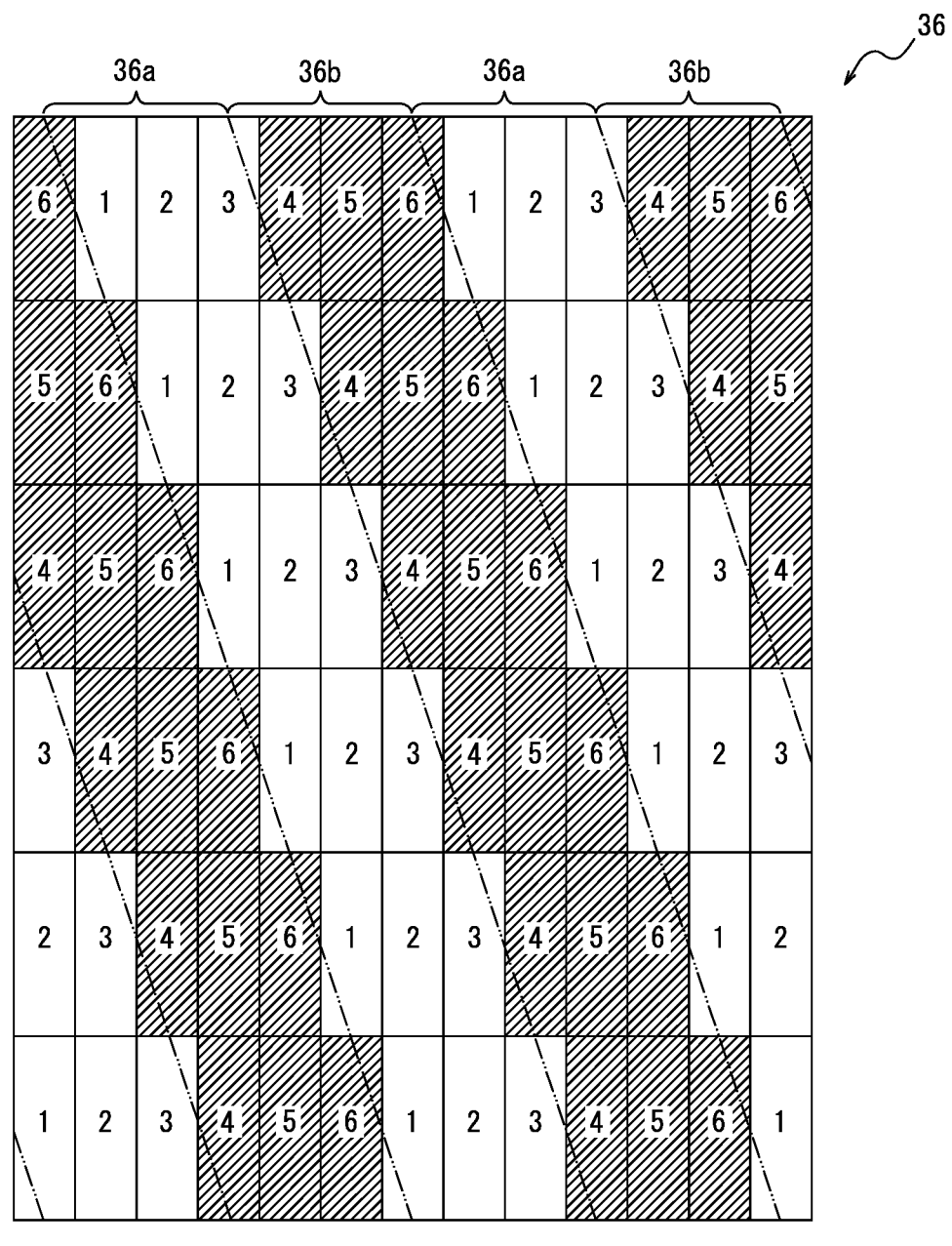
FIG. 10 is a diagram illustrating a display example of subpixels in the display panel of FIG. 7.

FIG. 10 illustrates the active area 36 as seen from the left eye of the user when the user is at an optimal viewing distance. The optimal viewing distance is the distance with the least crosstalk when observing the parallax image on the three-dimensional display device 30. In this case, crosstalk means that the image to be displayed for a right eye Er is incident on a left eye El, and the image to be displayed for the left eye El is incident on the right eye Er.

When viewed from the left eye of the user, a first region 36a divided by the alternate long and short dash line is a region that can be viewed by the left eye of the user through the light-transmitting regions 38 of the parallax barrier 33. A second region 36b is a region that is blocked by the dimming regions 37 of the parallax barrier 33 and cannot be seen by the left eye of the user. The boundary between the first region 36a and the second region 36b illustrated by the alternate long and short dash line in FIG. 10 is a projection of the boundary between the dimming regions 37 and the light-transmitting regions 38 of the parallax barrier 33 from the point of the optimal viewing distance where the left eye of the user is placed.

When the widths in the x direction of the dimming regions 37 and the light-transmitting regions 38 of the parallax barrier 33 are equal, the right eye Er of the user cannot view the first region 36a because the first region 36a is blocked by the dimming regions 37 of the parallax barrier 33. The right eye Er of the user can view the second region 36b through the light-transmitting regions 38 of the parallax barrier 33.

By displaying an image for the left eye El and an image for the right eye Er, which have parallax with each other, in each of the first region 36a visible from the left eye El and the second region 36b visible from the right eye Er, respectively, it is possible to display an image that is recognized as a three-dimensional image in the field of view of the user. Hereinafter, the image to be projected on the left eye El is referred to as a left-eye image, and the image to be projected on the right eye Er is referred to as a right-eye image.

In the example of FIG. 10, the first region 36a and the second region 36b each have a width of three subpixels in the x direction. In FIG. 10, the subpixels Sp are numbered 1 to 6 for explanation. The area of ½ or more the subpixel Sp of numbers 1 to 3 is included in the first region 36a. Therefore, most of the light emitted from the subpixels Sp of numbers 1 to 3 is propagated toward the position of the left eye El of the user by the parallax barrier 33. Therefore, the subpixels Sp of numbers 1 to 3 display the left-eye image. The area of ½ or more the subpixel Sp of numbers 4 to 6 is included in the second region 36b. Therefore, most of the light emitted from the subpixels Sp of numbers 4 to 6 is propagated toward the position of the right eye Er of the user by the parallax barrier 33. Therefore, the subpixels Sp of numbers 4 to 6 display the right-eye image. The display of the image is controlled by the controller 34.

As illustrated in FIG. 7, the controller 34 of the three-dimensional display device 30 may be connected to a detection device 39 that detects the positions of the left eye El and right eye Er of the user. In this case, the controller 34 can adjust the display of the display panel 32 according to the positions of the left eye El and the right eye Er acquired from the detection device 39. By doing so, even in the case where the position of the eyes of the user moves from a reference position, the three-dimensional display device 30 can maintain the three-dimensional display.

The controller 34 can display a combined image of the rotation speedometer image 21 and the vehicle speedometer image 22 as illustrated in FIGS. 2 to 6. The controller 34 can produce stereoscopic display by giving parallax to the image to be displayed. In the three-dimensional image to be displayed by the three-dimensional display device 30, an image element having a large parallax between the left-eye image and the right-eye image is recognized as being closer to the user. An image element having a small parallax between the left-eye image and the right-eye image is recognized as being distant. Therefore, the combined image of the rotation speedometer image 21 and the vehicle speedometer image 22 can be displayed as an image recognized as being located at a predetermined distance from the user. The predetermined distance can be, for example, 5 m or 10 m ahead of the user. A direction toward the front when viewed from the user is sometimes called a "depth direction".

The three-dimensional display device 30 can display an image in different modes for the switching operation of the shift position, illustrated in FIGS. 3 to 5. Display modes for switching the shift position will be described with reference to FIGS. 3 to 5.

From the state illustrated in FIG. 3, the driver or computer cuts off the clutch. When the clutch operation is carried out, the controller 34 acquires the information via the third input unit 35. The controller 34 apparently moves the vehicle speedometer image 22 corresponding to the second gear of the shift position in the depth direction when viewed from the user, on the three-dimensional image to be displayed on the three-dimensional display device 30. With this display method, when viewed from the user, the vehicle speedometer image 22 is recognized as being far away from the circumference of the rotation speedometer image 21 according to the operation of the clutch. The controller 34 does not have to change the display of the vehicle speedometer image 22 to a light color or monochrome display.

In FIG. 4, the vehicle speedometer images 22, 22a, and 22b having different shift positions are displayed so as to be viewed as being far away from the user. The vehicle speedometer images 22, 22a, and 22b move to the left (in the direction of the arrow) in a state of being recognized as being far away, and the vehicle speedometer image 22a corresponding to the third gear of the shift position moves to a position recognized as being located behind the rotation speedometer image 21. The controller 34 brings the apparently visible distance of the vehicle speedometer image 22a closer to the user until the distance is recognized as equidistant from the rotation speedometer image 21. The controller 34 uses the vehicle speedometer image 22 to form a combined image as illustrated in FIG. 5. With this display method, when viewed from the user, the vehicle speedometer image 22a approaches from behind the rotation speedometer image 21, and it is recognized that the rotation speedometer image 21 fits the hollow portion of the annular vehicle speedometer image 22a and is connected thereto.

The three-dimensional display device 30 can change the distance in the depth direction of the vehicle speedometer images 22, 22a, and 22b to be displayed, which is viewed by the user, in addition to the action and effect of the display device 10. The three-dimensional display device 30 can visually express the switching of the shift position of the transmission more realistically. The three-dimensional display device 30 can display the engine rotation speed and the vehicle speed in a more realistic and interesting manner for the user.

Figure 11:
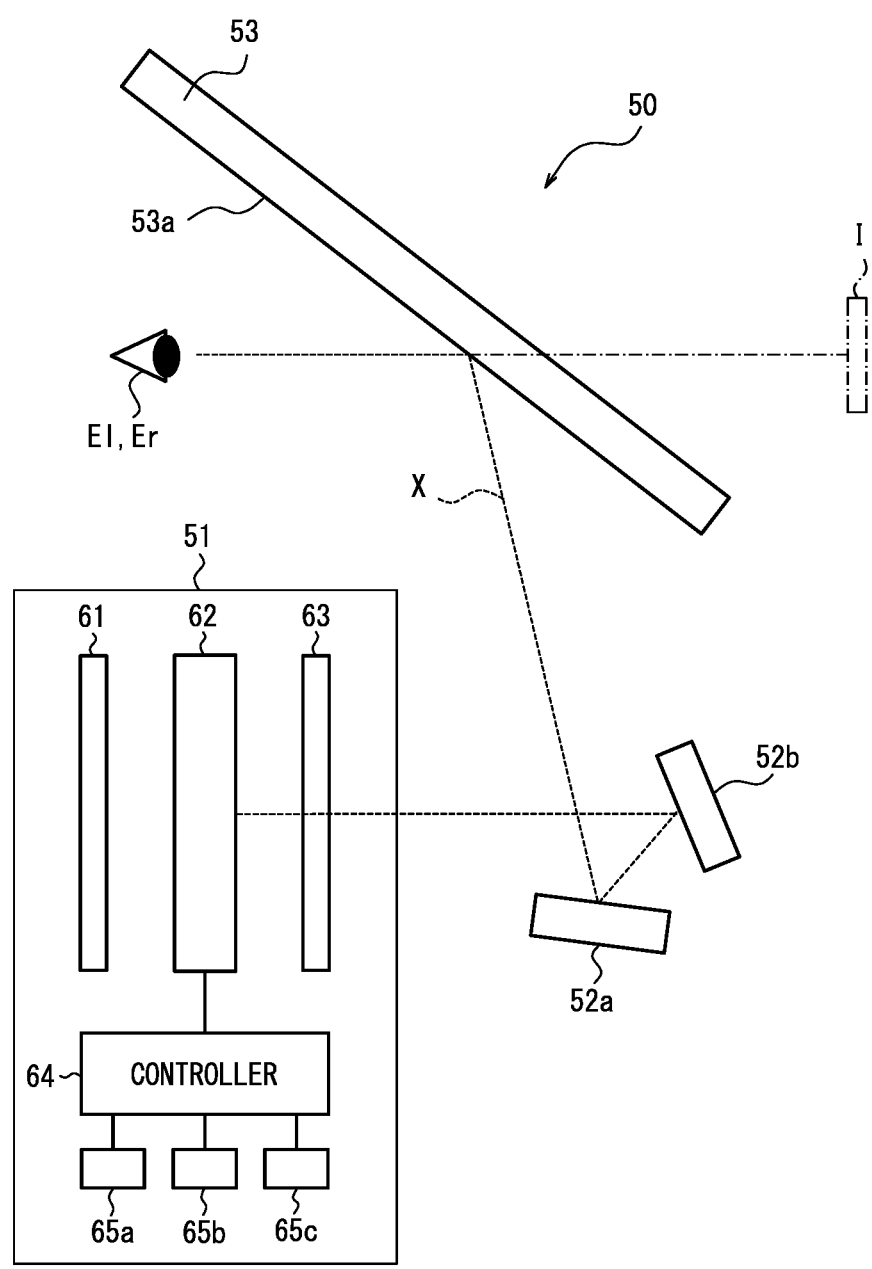
FIG. 11 is a schematic diagram of a configuration of a head-up display (HUD) according to a third embodiment.

A head-up display 50 in which a three-dimensional display device is applied to a head-up display (HUD) will be described. As illustrated in FIG. 11, the head-up display 50 includes a three-dimensional display device 51, optical members 52a and 52b, and a projected member 53. The optical members 52a, 52b, and the projected member 53 form at least a part of an optical system that projects a virtual image in the field of view of the user. The optical members 52a and 52b may include a concave mirror.

The three-dimensional display device 51 includes an irradiator 61, a display panel 62, a parallax barrier 63, a controller 64, a first input unit 65a, a second input unit 65b, and a third input unit 65c. Since the irradiator 61, the display panel 62, the parallax barrier 63, the controller 64, the first input unit 65a, the second input unit 65b, and the third input unit 65c are the same components as the irradiator 31, the display panel 32, and the parallax barrier 33, the controller 34, the first input unit 35a, the second input unit 35b, and the third input unit 35c, respectively, the description thereof will be omitted.

The head-up display 50 is configured so that the image light emitted from the three-dimensional display device 51 reaches the projected member 53 via the optical members 52a and 52b. The head-up display 50 is configured so that the image light reflected by the projected member 53 reaches the left eye El and right eye Er of the user. That is, the head-up display 50 is configured so as to project image light of the left-eye image and the right-eye image to be displayed in the active area of the three-dimensional display device 51 along an optical path X indicated by the broken line so as to form a virtual image in the fields of view of the left eye El and right eye Er of the user, respectively. The user can view the image light that has arrived along the optical path X as a virtual image 1.

Figure 12:
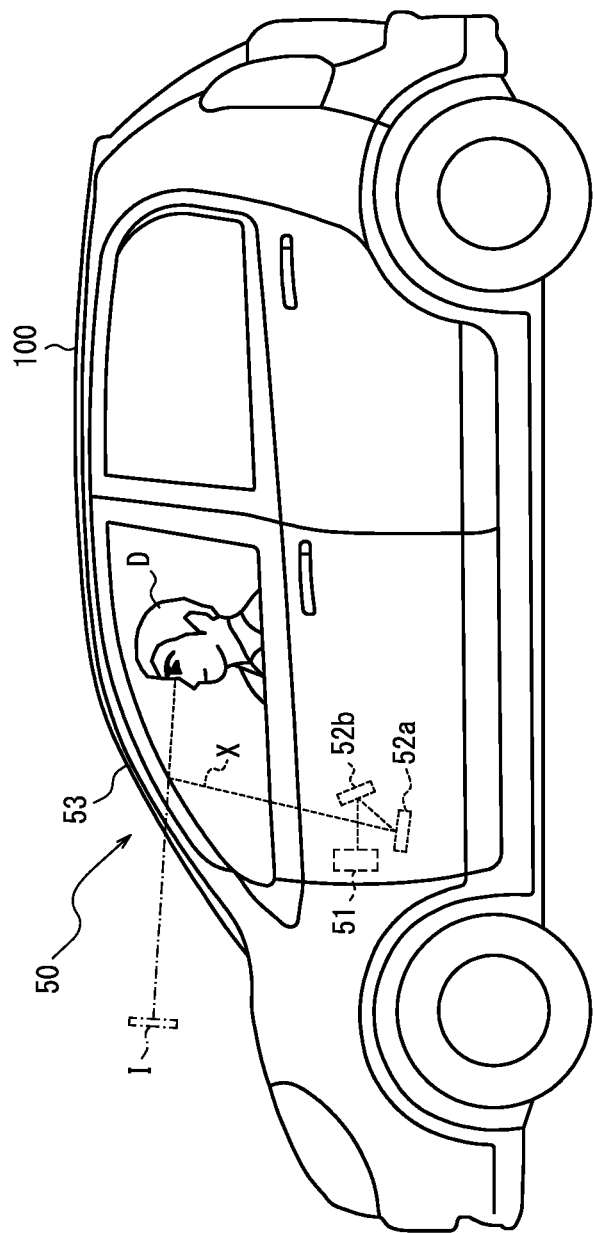
FIG. 12 is a diagram illustrating an example of a vehicle equipped with the head-up display of FIG. 11.

As illustrated in FIG. 12, the head-up display 50 may be mounted on a vehicle 100. A part of the configuration of the head-up display 50 may be shared with other devices and parts included in the vehicle 100. For example, the vehicle 100 may also use a windshield as the projected member 53 of the head-up display 50.

Figure 13:
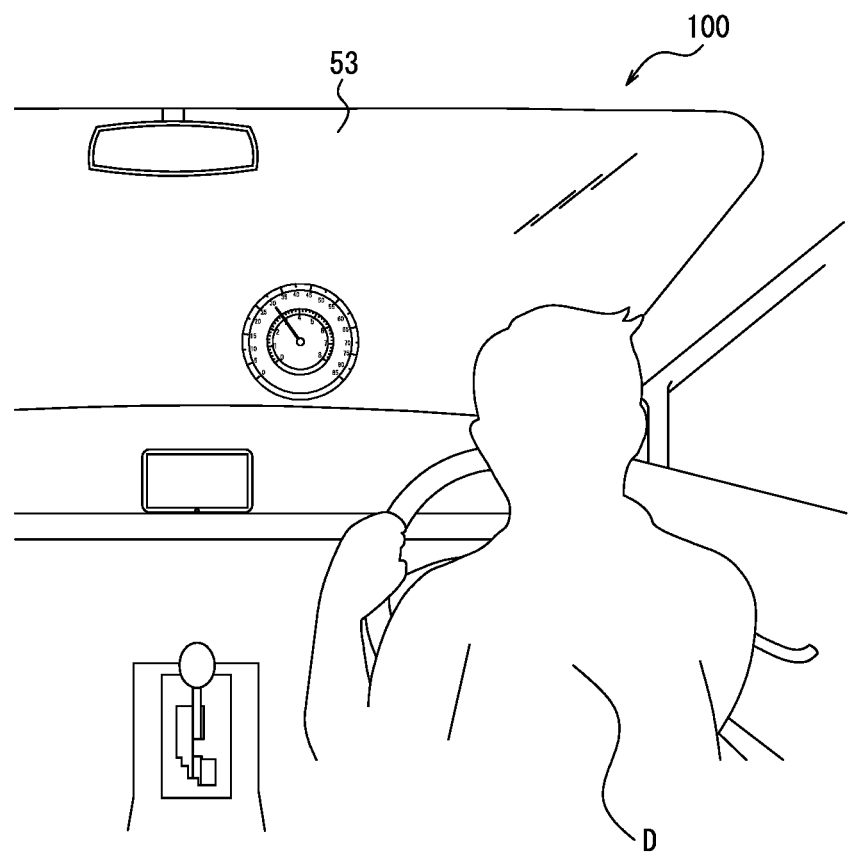
FIG. 13 is a diagram illustrating a display example of the head-up display of FIG. 11.

FIG. 13 illustrates a display image of the head-up display 50 as seen from the user side. The projected member 53 is placed in front of the driver's seat in which the user who is a driver D sits. The head-up display 50 can display a combined image of the rotation speedometer and the vehicle speedometer at a position in front of the driver D, for example, 10 m to 20 m, overlaid with the background scenery. The head-up display 50 may display various kinds of information related to the vehicle 100 in addition to the engine rotation speed and the vehicle speed. Various kinds of information regarding the vehicle 100 include information such as the remaining amount of fuel such as gasoline, the total mileage of the vehicle 100, the total mileage of the section of the vehicle 100, the water temperature of the engine cooling water system, and the like.

In addition to the effect of the three-dimensional display device 30, the head-up display 50 has the effect that the user can see the rotation speedometer image 21 and the vehicle speedometer image 22 without significantly changing the line of sight and the focus of the eyes. With the head-up display 50, the eyes of the user are less likely to get tired, and the safety can be further improved.

Figure 14:
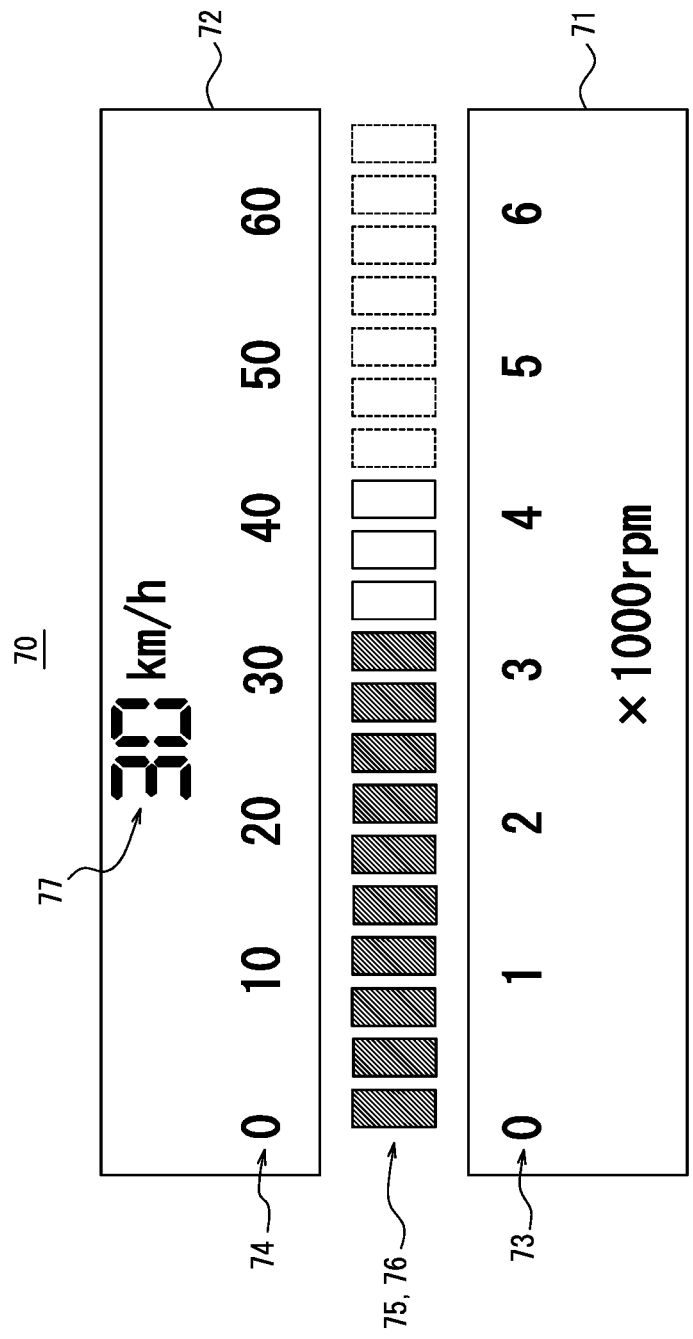
FIG. 14 is a diagram illustrating another display example of the display device, the three-dimensional display device, and the head-up display.

The rotation speedometer image 21 and the vehicle speedometer image 22 were displayed as images having a circular outer shape and an indicator needle. However, the display mode by images of the engine speedometer and the vehicle speedometer is not limited thereto. FIG. 14 illustrates a display image 70. The display image 70 may be displayed on any of a two-dimensional display device, a three-dimensional display device, and a head-up display.

The display image 70 includes a rotation speedometer image 71 and a vehicle speedometer image 72. The rotation speedometer image 71 includes a rotation speed scale 73 and a rotation speed indicator element 75. The rotation speed indicator element 75 is a first indicator element. The vehicle speedometer image 72 includes a vehicle speed scale 74 and a vehicle speed indicator element 76. The vehicle speed indicator element 76 is a second indicator element. On the rotation speed scale 73 and the vehicle speed scale 74, the numbers on the scales indicating the rotation speed and the vehicle speed are linearly arranged, respectively. The scales of the rotation speed scale 73 and the vehicle speed scale 74 are numerical values corresponding to each other according to the shift position. When the clutch is engaged, the numbers facing each other on the rotation speed scale 73 and the vehicle speed scale 74 correspond one to one. In the example illustrated in FIG. 14, 3000 rpm corresponds to 30 km/h, and 4000 rpm corresponds to 40 km/h.

The rotation speed indicator element 75 and the vehicle speed indicator element 76 include a plurality of rectangular light-emitting portions sandwiched between the rotation speed scale 73 and the vehicle speed scale 74. The light-emitting portion can indicate whether to display the rotation speed or the vehicle speed by the color. When the light-emitting portion is white, the clutch is engaged, and both the rotation speed and the vehicle speed can be displayed by the same light-emitting portion. When the clutch is disengaged or half-engaged, a discrepancy occurs between the position of the light-emitting portion indicating the rotation speed and the position of the light-emitting portion indicating the vehicle speed. For example, when the rotation speed is 4000 rpm and the speed is 30 km/h, the head-up display 50 is configured so that the light-emitting portion of the 0 km/h to 30 km/h portion can emit light in a first color (for example, red) and the light-emitting portion of the 3000 rpm to 4000 rpm portion can emit light in a second color (for example, blue).

The display of the vehicle speedometer image 72 is switched according to the change of the shift position. The vehicle speedometer image 72 displays the numerical value of the vehicle speed scale 74 corresponding to the facing numerical value of the rotation speed scale 73 according to the gear ratio of the shift position. Various methods can be adopted for switching the display of the vehicle speedometer image 72. For example, the vehicle speedometer image 72 can be moved left and right on the display image 70 to be switched to another vehicle speedometer image 72. The vehicle speedometer image 72 has a flat plate shape, and the display content may be switched each time the image is rotated in the vertical direction and turned inside out.

The display image 70 may include a vehicle speed digital display unit 77. The vehicle speed digital display unit 77 is a third image. The vehicle speed digital display unit 77 displays the vehicle speed by the numerals of the digital image. By providing the vehicle speed digital display unit 77, the user can check the vehicle speed even when switching of the vehicle speedometer image 72 is carried out. The display image 70 may further include a display region for displaying character information indicating the shift position (for example, "L", "S", "3", "D", and the like).

The configuration according to the disclosure is not limited to the plurality of embodiments described above and can be modified or changed in many ways. For example, the functions and the like included in each component can be rearranged so as not to be logically inconsistent, and a plurality of components and the like can be combined into one or divided. Although the plurality of embodiments according to the disclosure have been described with a focus on the device, the plurality of embodiments according to the disclosure can also be realized as a method including steps executed by each component of the device. The plurality of embodiments according to the disclosure can also be realized as a method, a program, or a storage medium on which a program is recorded, which is executed by a processor included in the device. It should be understood that the scope of the disclosure includes such a method, program, or storage medium as well.

For example, the display image 70 includes numerical information or character information indicating the vehicle speed and the shift position. However, even in the combined image of the rotation speedometer image 21 and the vehicle speedometer image 22 based on the circular outer shape of FIGS. 2 to 6, the numerical value of the vehicle speed and the characters representing the shift position can be displayed in the image.

In the disclosure, the descriptions such as "first" and "second" are identifiers for distinguishing corresponding configurations. Configurations distinguished by the descriptions such as "first" and "second" in the disclosure can exchange numbers in the corresponding configurations. For example, the first direction can exchange the identifiers "first" and "second" with the second direction. The exchange of identifiers takes place at the same time. Even after exchanging identifiers, the corresponding configuration is distinguished. The identifier may be deleted. The configuration with the identifier deleted is distinguished by a reference numeral. It should not be used as a basis for interpreting the order of the corresponding configurations, the rationale for the existence of identifiers with lower numbers, or the rationale for the existence of identifiers with higher numbers, based solely on the description of identifiers such as "first" and "second" in the disclosure.

REFERENCE SIGNS LIST

10: Display device
11: Display panel
12: Controller
13: First input unit
14: Second input unit
15: Third input unit
16: In-vehicle network
17: First ECU
18: Second ECU
19: In-vehicle sensor
20: Display image
21: Rotation speedometer image (First image)
22, 22a, 22b: Vehicle speedometer image (Second image)
23: Rotation speed scale
24: Rotation speed indicator needle (First indicator element)
25: Vehicle speed scale
26: Vehicle speed indicator needle (Second indicator element)
30: Three-dimensional display device
31: Irradiator
32: Display panel
33: Parallax barrier
34: Controller
35a: First input unit
35b: Second input unit
35c: Third input unit
36: Active area
36a: First region 36b: Second region
37: Dimming region
38: Light-transmitting region
39: Detection device
50: Head-up display
51: Three-dimensional display device
52a, 52b: Optical member
53: Projected member
53a: Projected surface
61: Irradiator
62: Display panel
63: Parallax barrier
64: Controller
65a: First input unit
65b: Second input unit
65c: Third input unit
70: Display image
71: Rotation speedometer image (First image)
72: Vehicle speedometer image (Second image)
73: Rotation speed scale
74: Vehicle speed scale
75: Rotation speed indicator element (first indicator element)
76: Vehicle speed indicator element (Second indicator element)
77: Vehicle speed digital display unit
100: Vehicle
El: Left eye
Er: Right eye
P: Pixel
Sp: Subpixel

The invention claimed is:

1. A display device to be mounted on a vehicle, comprising:
   a display panel;
   a first input unit configured so as to acquire an engine rotation speed;
   a second input unit configured so as to acquire a vehicle speed;
   a third input unit configured so as to acquire a shift position of a transmission of the vehicle; and
   a controller configured so that a first image representing the engine rotation speed and one or more second images representing the vehicle speed are combined and a combined image is displayed on the display panel,
   the controller being configured so that switching of the second images is carried out based on the shift position
   the first image being configured so as to comprise a first indicator element indicating the engine rotation speed,
   the second images being configured so as to comprise a second indicator element indicating the vehicle speed,
   the controller being configured so that in a steady state where switching of the shift position is not carried out, the first indicator element and the second indicator element are displayed as one indicator element, and
   the controller being configured so that, when switching of the shift position is carried out, the first indicator element and the second indicator element are displayed as different indicator elements and a region between the first indicator element and the second indicator element is highlighted.

2. The display device according to claim 1, wherein the controller is configured so that, when switching of the shift position is carried out, the second images corresponding to different shift positions are displayed side by side and one of the second images is moved to a vicinity of the first image.

3. The display device according to claim 1, wherein the first image has a circular shape, and the second images each have an annular shape having a hollow portion of a same size as a size of the first image.

4. The display device according to claim 1, wherein the display panel further comprises a third image that displays a vehicle speed with numerals.

5. A three-dimensional display device to be mounted on a vehicle, comprising:
   a display panel comprising an active area which includes a plurality of subpixels arranged in a grid along a first direction and a second direction orthogonal to the first direction;
   an optical element configured so as to define a direction of image light emitted from the subpixels, and propagate image light emitted from the subpixels in a first region, toward a position of a left eye of a user and propagate image light emitted from the subpixels in a second region different from the first region, toward a position of a right eye of the user;
   a first input unit configured so as to acquire an engine rotation speed;
   a second input unit configured so as to acquire a vehicle speed;
   a third input unit configured so as to acquire a shift position of a transmission of the vehicle; and
   a controller configured so that a first image representing the engine rotation speed and one or more second images representing the vehicle speed are combined into an image having parallax with respect to the right eye and left eye of the user and a combined image is displayed on the display panel,
   the controller being configured so that switching of the second images is carried out based on the shift position, and
   that, when switching of the second images is carried out, the second images are displayed by giving parallax thereto so that the second images are recognized as moving relative to the first image by a distance of from the user to the second images that is different from a distance of from the user to the first image.

6. A head-up display to be mounted on a vehicle, comprising:
   a display panel comprising an active area which includes a plurality of subpixels arranged in a grid along a first direction and a second direction orthogonal to the first direction;
   an optical element configured so as to define a direction of image light emitted from the subpixels, and propagate image light emitted from the subpixels in a first region, toward a position of a left eye of a user and propagate image light emitted from the subpixels in a second region different from the first region, toward a position of a right eye of the user;
   an optical system configured so as to project the image light which is emitted from the active area and whose direction is defined by the optical element so as to form a virtual image in a field of view of the user;
   a first input unit configured so as to acquire an engine rotation speed;
   a second input unit configured so as to acquire a vehicle speed;
   a third input unit that is configured so as to acquire a shift position of a transmission of the vehicle; and a controller configured so that a first image representing the engine rotation speed and one or more second images representing the vehicle speed are combined into an image having parallax with respect to the right eye and left eye of the user and a combined image is displayed on the display panel, the controller being configured so that switching of the second images is carried out based on the shift position, that, when switching of the second images is carried out, the second images are displayed by giving parallax thereto so that the second images are recognized as moving relative to the first image by a distance of from the user to the second images that is different from a distance of from the user to the first image.

7. A vehicle, comprising:
a three-dimensional display device comprising
- a display panel comprising an active area which includes a plurality of subpixels arranged in a grid along a first direction and a second direction orthogonal to the first direction;
- an optical element configured so as to define a direction of image light emitted from the subpixels, and propagate image light emitted from the subpixels in a first region, toward a position of a left eye of a user and propagate image light emitted from the subpixels in a second region different from the first region, toward a position of a right eye of the user;
- an optical system configured so as to project the image light which is emitted from the active area and whose direction is defined by the optical element so as to form a virtual image in a field of view of the user;
- a first input unit configured so as to acquire an engine rotation speed;
- a second input unit configured so as to acquire a vehicle speed;
- a third input unit configured so as to acquire a shift position of a transmission; and
- a controller configured so that a first image representing the engine rotation speed and one or more second images representing the vehicle speed are combined into an image having parallax with respect to the right eye and left eye of the user and a combined image is displayed on the display panel, the controller being configured so that switching of the second images is carried out based on the shift position, and that, when switching of the second images is carried out, the second images are displayed by giving parallax thereto so that the second images are recognized as moving relative to the first image by a distance of from the user to the second images that is different from a distance of from the user to the first image.

8. A display device to be mounted on a vehicle, comprising:
- a display panel;
- a first input unit configured so as to acquire an engine rotation speed;
- a second input unit configured so as to acquire a vehicle speed;
- a third input unit configured so as to acquire a shift position of a transmission of the vehicle; and
- a controller configured so that a first image representing the engine rotation speed and one or more second images representing the vehicle speed are combined and a combined image is displayed on the display panel, the controller being configured so that switching of the second images is carried out based on the shift position, the controller being configured so that, when switching of the shift position is carried out, the second images corresponding to different shift positions are displayed side by side and one of the second images is moved to a vicinity of the first image.

* * * * *